United States Patent
Bradford et al.

(10) Patent No.: US 8,514,724 B2
(45) Date of Patent: Aug. 20, 2013

(54) TESTING CONNECTIVITY IN NETWORKS USING OVERLAY TRANSPORT VIRTUALIZATION

(75) Inventors: Richard Bradford, Lancaster, MA (US); Richard Stewart, Beverly, MA (US)

(73) Assignee: Cisco Technology, Inc., San Jose, CA (US)

( * ) Notice: Subject to any disclaimer, the term of this patent is extended or adjusted under 35 U.S.C. 154(b) by 282 days.

(21) Appl. No.: 13/006,134

(22) Filed: Jan. 13, 2011

(65) Prior Publication Data
US 2012/0182885 A1 Jul. 19, 2012

(51) Int. Cl.
- G06F 11/00 (2006.01)
- H04J 1/16 (2006.01)
- H04J 3/14 (2006.01)
- H04L 12/26 (2006.01)

(52) U.S. Cl.
USPC .................. 370/241; 370/241.1; 370/390

(58) Field of Classification Search
USPC .............. 370/390, 389, 392, 241, 241.1
See application file for complete search history.

(56) References Cited

U.S. PATENT DOCUMENTS

| | | | |
|---|---|---|---|
| 7,835,276 B2* | 11/2010 | Naik et al. | 370/230 |
| 2006/0146857 A1* | 7/2006 | Naik et al. | 370/432 |
| 2006/0154603 A1* | 7/2006 | Sachs et al. | 455/39 |
| 2007/0268817 A1* | 11/2007 | Smallegange et al. | 370/216 |
| 2008/0095093 A1* | 4/2008 | Oogushi et al. | 370/312 |
| 2008/0112331 A1* | 5/2008 | Long et al. | 370/245 |
| 2010/0080238 A1* | 4/2010 | Allan et al. | 370/401 |
| 2011/0069607 A1* | 3/2011 | Huang | 370/217 |
| 2012/0093002 A1* | 4/2012 | Osborne | 370/241.1 |

OTHER PUBLICATIONS

Cisco Systems Inc., "Ethernet Operations, Administration and Maintenance", First Published Nov. 20, 2006, 62 pages.

Enterprisenetworkingplanet.com, "Cisco Introduces Overlay Transport Virtualization", Website: http://www.enterprisenetworkingplanet.com/news/article.php/3863591/Cisco-Introduces-Overlay-Transport-Virtualization.htm, dated, Feb. 8, 2010, 5 pages.

* cited by examiner

*Primary Examiner* — Chuong T Ho
(74) *Attorney, Agent, or Firm* — Hickman Palermo Truong Becker Bingham Wong LLP

(57) ABSTRACT

Techniques are provided for detecting connectivity failures within an OTV network using CFM. In an embodiment, a method and apparatus for using E-OAM to accurately test connectivity in an OTV network is provided. In an embodiment, one method comprises: in a first edge router that is in a local area network (LAN) and that is coupled to a core network: maintaining, for each node of the LAN, a mapping of a source address to one or more delivery multicast groups, each delivery multicast group comprising a set of other edge routers, each of the other edge routers having a connection to a distinct LAN; receiving a frame from a particular source node of a particular source address; sending the frame to a plurality of the delivery multicast groups that are mapped, in the mapping, to the particular source address.

16 Claims, 6 Drawing Sheets

FIG. 4

| 410 | |
|---|---|
| MAC1 | DG1, DG2 |
| MAC2 | DG3 |

TESTING CONNECTIVITY IN NETWORKS USING OVERLAY TRANSPORT VIRTUALIZATION

TECHNICAL FIELD

The present disclosure generally relates to network management. The disclosure relates more specifically to testing connectivity in networks using overlay transport virtualization.

BACKGROUND

Connectivity Fault Management (CFM) is an IEEE standard that defines protocols and practices for Ethernet Operations Administration and Maintenance (E-OAM). CFM comprises three protocols for monitoring and troubleshooting Ethernet LANs and WANs. One of these protocols provides a connectivity check intended to permit a network administrator to determine if nodes are connected. A CFM continuity check message (CCM) is a unidirectional multicast message that is received as a heartbeat. No response to the CCM message is sent or expected, but a unicast response may acknowledge a continuity check message. The continuity protocol tests connectivity between a source node and all other nodes that are expected to be reachable by the multicast message.

E-OAM was intended to be used in a LAN environment where every source of Ethernet frames is connected to every destination of Ethernet frames via a single path in either direction. The CCM frames are sent using Layer 2 multicast and are expected to follow the single path between the devices. LANs typically use a Spanning Tree Protocol (STP) to create a single path between any two devices and that path is used for unicast and multicast packets in both forward and reverse directions. Therefore, a single packet exchange is expected to traverse every link along the path between the two devices. If a frame can travel from a source to the destination, it is assumed that the frame can also travel from the destination to the source over the same path.

OTV may be used for tunneling Ethernet frames over IP and is commercially available, for example, from Cisco Systems, Inc., San Jose, Calif., as part of the Nexus 7000 switch. OTV provides MAC-address-based routing, and allows the extension of a Layer 2 network across remote data center sites. An out-bound frame is encapsulated in an IP header and transported to the edge device within the LAN and that is coupled to the core network. The IP packet may be transported through the core network by any IP-based transport such as IP, MPLS, SONET, etc.

A LAN that is expanded into a virtual LAN over a WAN may not have a single path between source and destination nodes. Unlike LAN protocols, OTV may use different paths for unicast and multicast, which interferes with E-OAM's ability to reliably detect failures as well as to reliably diagnose failures once detected. As frames are delivered through the core network, there may be multiple routes that the frames could take to arrive at their destination. Furthermore, a frame returning from a destination back to a source may take a different path than the path taken to arrive at the destination from the source. For example, a CCM may traverse one path between a source and destination node, but another unchecked path may be used for delivering actual traffic. If the unchecked path fails, the CCM may not detect the failure.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 4 illustrates an example of pre-computing the mapping between a MAC address and a delivery multicast group.

DESCRIPTION OF EXAMPLE EMBODIMENTS

Figure 1:
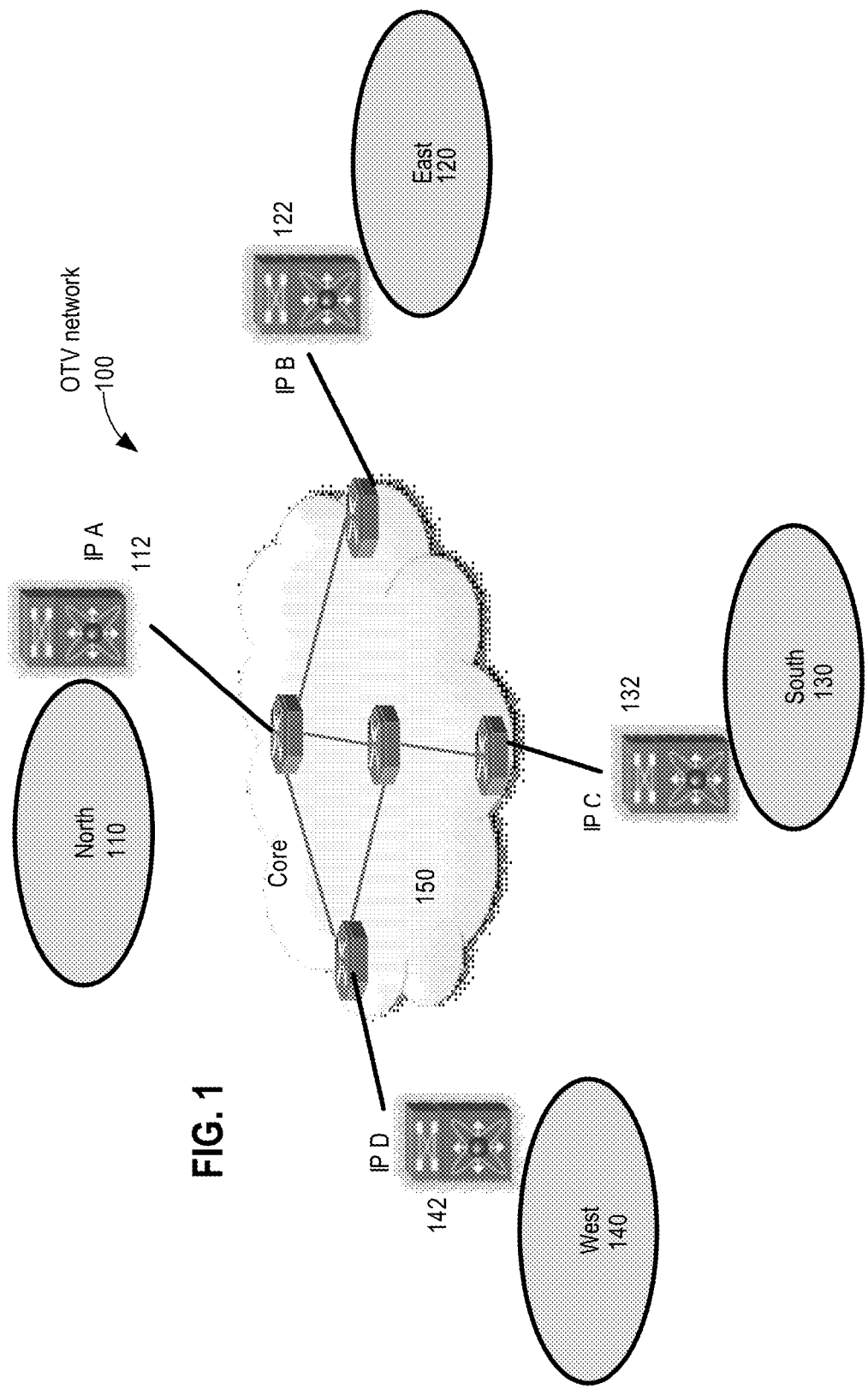
FIG. 1 illustrates an example OTV network across multiple local area sites.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

In an embodiment, a method comprises, in a first edge router that is in a local area network (LAN) and that is coupled to a core network: maintaining, for each node of the LAN, a mapping of a source address to one or more delivery multicast groups, each delivery multicast group comprising a set of other edge routers, each of the other edge routers having a connection to a distinct LAN; receiving a frame from a particular source node of a particular source address; sending the frame to a plurality of the delivery multicast groups that are mapped, in the mapping, to the particular source address.

In an embodiment, mappings are maintained that allow the OTV edge router to determine which delivery multicast groups to send a CCM frame out on. For example, the method may further comprise, for each source node in the LAN, maintaining an association between a unique source node identifier and a network address; for each local source multicast group to which the particular source node sends traffic, creating an association between the particular source address and said each local source multicast group; for said each local source multicast group, maintaining an association with a delivery multicast group of the delivery multicast groups.

An embodiment may provide for precomputing a source node to delivery group mapping. For example, in an embodiment, the method further comprises determining and storing an association between each unique source node identifier and a set of delivery multicast groups to which traffic is sent from a source node identified by said each unique source identifier.

In an embodiment, the unique source node identifier is a media access control (MAC) address. In an embodiment, the network address is an internet protocol (IP) address. In an embodiment, the frame is a continuity check message (CCM) frame. In an embodiment, the method is not required to wait for a CFM frame to be received from a source node but can initiate CFM "hello" within the OTV edge router itself. Thus, in an embodiment, the method may further comprises the first edge router periodically sending a frame to each delivery multicast group that is stored in association with any node in the LAN.

In an embodiment, the frame is a CCM frame.

The disclosure also provides an end-to-end description of CFM flow from the perspective of a source OTV edge router. In an embodiment, a method comprises, in a first edge router that is in a local area network (LAN) and that is coupled to a core network: receiving, from a source node in the LAN, a first CCM multicast frame; retrieving a set of delivery multicast groups based on the source node, each delivery multicast group of the set of delivery multicast groups having members comprising a set of edge routers; sending a second CCM frame to the set of delivery multicast groups; receiving from said each edge router of the set of edge routers a unicast acknowledgement of receipt of the first CCM multicast frame; determining whether the acknowledgement of receipt has been received from a union of all members of the set delivery multicast groups.

In an embodiment, the method further comprises raising an alert in response to determining that the acknowledgement of receipt has not been received from a union of all members of the set of delivery multicast groups.

Overview

In an embodiment, techniques are provided for detecting connectivity failures within an OTV network using CFM. CFM assumes that there is exactly one path from a particular source to a particular destination and back to the source in the network. If a test packet can traverse this path, then the path between source and destination is working properly. However, OTV breaks these assumptions by providing multiple alternative paths through the core network. Certain techniques provided herein may extend the functionality of an OTV edge device to test all possible paths between a source and destination pair in response to receiving a CCM packet from a source node in the LAN. In addition, the OTV edge device/maintenance end point can independently check connectivity within the core independent of any source node requesting a continuity check.

In an embodiment, a method for using E-OAM to accurately test connectivity in an OTV network is provided. An OTV network provides a virtual LAN service across geographically distant sites. Although a device in the OTV network perceives all other devices to reside within its same LAN, the presence of a core network that federates the multiple local sites complicates the testing and diagnosis of connectivity between devices. In particular, the presence of the intervening core network breaks the assumption that there is only one path between two devices in the network. The approach herein extends OTV so that E-OAM protocols may be used in an OTV network for detecting and diagnosing that a path in the network is not available.

FIG. 1 illustrates an example OTV network across multiple local area sites. FIG. 1 illustrates an OTV network 100 comprising four (4) data sites denoted as North 110, East 120, South, 130 and West 140, each of which is a local LAN that has WAN connectivity to each other LAN through a core provider network 150. Devices in one LAN may send Ethernet packets to devices in another LAN as though they were on the same LAN. To bridge the LANs, an OTV edge device that is part of a LAN is coupled with the core. Thus, OTV edge devices 112, 122, 132, 142 are coupled to edge routers of core network 150. OTV edge device 112 is part of data site North 110 and the other OTV edge devices 122, 132, 142 are respectively associated with data sites East 120, South 130, West 140. Each OTV edge device 112, 122, 132, 142 acts a local proxy device within the LAN and forwards traffic into and out of the LAN across the core. The OTV edge device may also act as a CFM maintenance point for providing maintenance and management of the OTV network.

Figure 2:
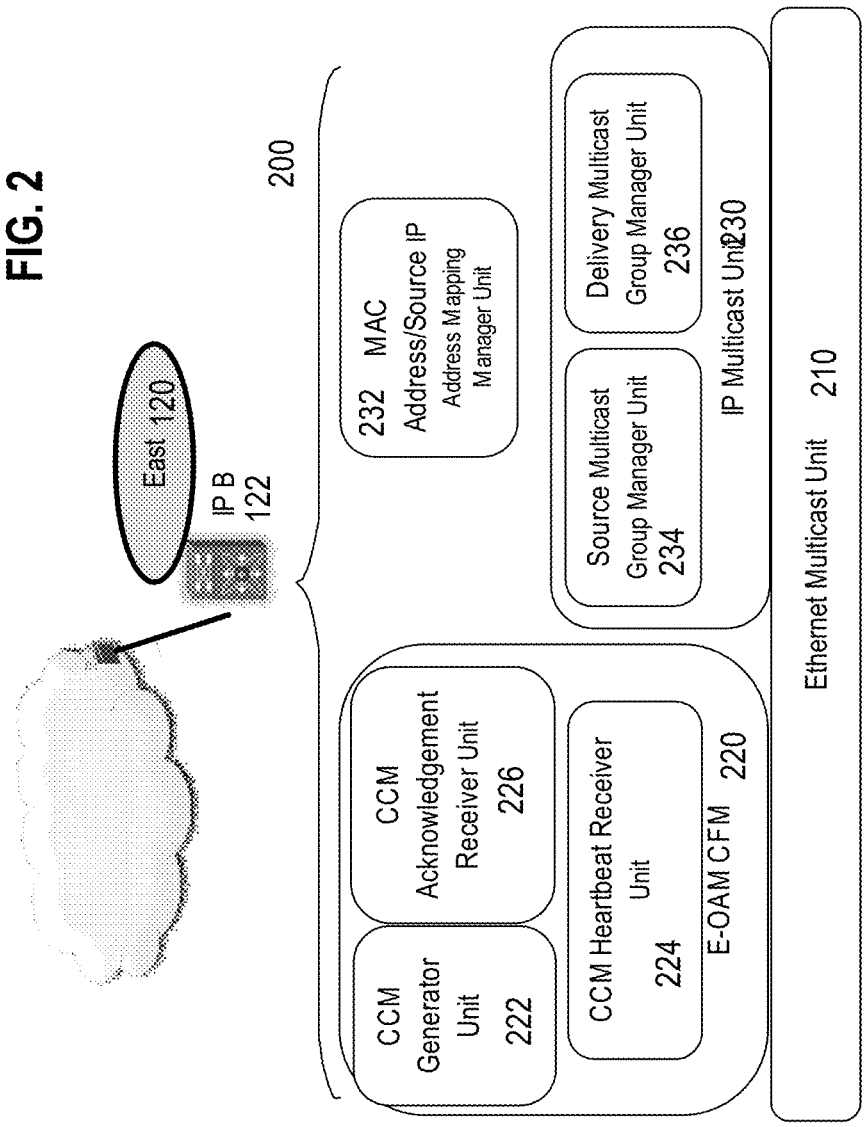
FIG. 2 illustrates functional units of an example OTV edge device.

FIG. 2 illustrates functional units of an example OTV edge device. FIG. 2 shows example components 200 that may run on an OTV edge device such as edge device 122 of data site East 120, and that functionally extend OTV so that CFM can operate in the OTV network to provide the benefits described herein. In various embodiments, components 200 comprise one or more computer programs, other software elements, firmware, ASICs, FPGAs, other hardware elements, or a combination thereof. Thus, the OTV edge device may comprise a special-purpose computer configured as describe herein to provide the particular functions that are described herein. The components 200 may include:

Ethernet Multicast Unit 210: delivers multicast Ethernet frames to devices within the local and wide-area network.

IP Multicast Unit 230: a grouping of components related to the management IP multicast groups and comprising source multicast group manager unit 234 and delivery multicast group manager unit 236.

Source Multicast Group Manager Unit 234: maintains a list of source multicast groups to which each source node within a LAN can send. A source multicast group is a group of devices that receives multicast traffic within a LAN. When the source multicast group includes devices outside the LAN, each OTV edge device acts as a proxy for all remote devices, and forwards the traffic over the WAN to the local sites on which recipients reside.

Delivery Multicast Group Manager Unit 236: maintains a mapping between each source multicast group and its corresponding delivery group across the wide area network. A delivery group is comprised of a set of OTV edge routers that receive multicast messages on behalf of nodes within the LAN in which they reside.

MAC Address/Source IP Address Mapping Manager Unit 232: discovers an association between MAC address and source IP address by looking inside of IP packets, and maintains a table of these associations.

E-OAM CFM 220: a group of components that implements the CFM messages over OTV and comprising CCM generator unit 222, CCM acknowledgment receiver unit 226, and CCM heartbeat receiver unit 224.

CCM Generator Unit 222: The CCM Generator Unit 222 generates continuity check messages that are uni-directional, multicast heartbeat messages to all destinations in the WAN that are reachable from the source node in the LAN.

CCM Acknowledgement Receiver Unit 224: The CCM Acknowledgement Receiver Unit 224 receives unicast messages back from receivers of the heartbeat CCM messages and determines whether there is a failure along any of the paths in the network. In an embodiment, only negative acknowledgements are received to indicate that sufficient heartbeats were missed to indicate a failure. In an alternative embodiment, a negative acknowledgement may be received any time a heartbeat is missed by a receiver, and the CCM Acknowledgement Receiver Unit 224 determines whether the number and/or frequency of missed heartbeats indicate a path failure. In yet another embodiment, the CCM Acknowledgement Receiver Unit 224 receives positive acknowledgements from each receiver to indicate that a heartbeat message was received, and the CCM Acknowledgement Receiver Unit 224 determines whether there is a failure based on noticing when such positive acknowledgements are missing.

When the CCM Acknowledgement Receiver Unit 224 determines that a path failure has occurred, the unit 224 may perform one or more actions such as raising an alert, or causing the delivery groups or unicast message routing to be modified to avoid the failed path.

CCM Heartbeat Receiver Unit 226: The CCM Heartbeat Receiver Unit 226 may determine that an expected heartbeat is missed and may determine when and whether to conclude that a path is experiencing a failure. In response to determining that a failure has occurred, the CCM Heartbeat Receiver Unit 226 may send a unicast message to the expected source of the missing heartbeat to alert the source of the failure. In an alternative embodiment, the CCM Heartbeat Receiver Unit 226 may positively acknowledge received heartbeat messages by sending a unicast acknowledgement to the source of the heartbeat.

In an embodiment, components 200 cooperate to extend the functionality of the OTV edge device to perform maintaining information about the network, receiving a CFM multicast frame from a source node within the LAN, and forwarding the multicast frame in an IP multicast packet to a set of delivery groups that includes all possible recipients of the multicast message and which is guaranteed to traverse every potential path in the network between the source node and a destination node in the delivery groups.

A delivery group may comprise a set of OTV edge devices. A delivery group may be implemented in the core network as a spanning tree in which there is only one path from the source to any point in the spanning tree. Thus, sending a multicast packet to a particular delivery group ensures that there is only one path between the source and any recipient in the group.

Ensuring all Paths are Tested

As explained above, in normal operation CFM assumes that a source CFM generator resides in the same LAN as the targeted recipients, and thus, the two nodes reside in the same local LAN. CFM assumes that there is only one path between the source and destination. To use CFM to correctly test and diagnose problems in OTV, all paths between a source and destination should be tested. In an embodiment, an OTV edge device maintains information sufficient to permit the OTV edge device to send a CCM message in an IP packet to all other edge device IP unicast addresses and delivery multicast group addresses that are reachable from its LAN. Responses from all recipients may be tracked.

Figure 3:
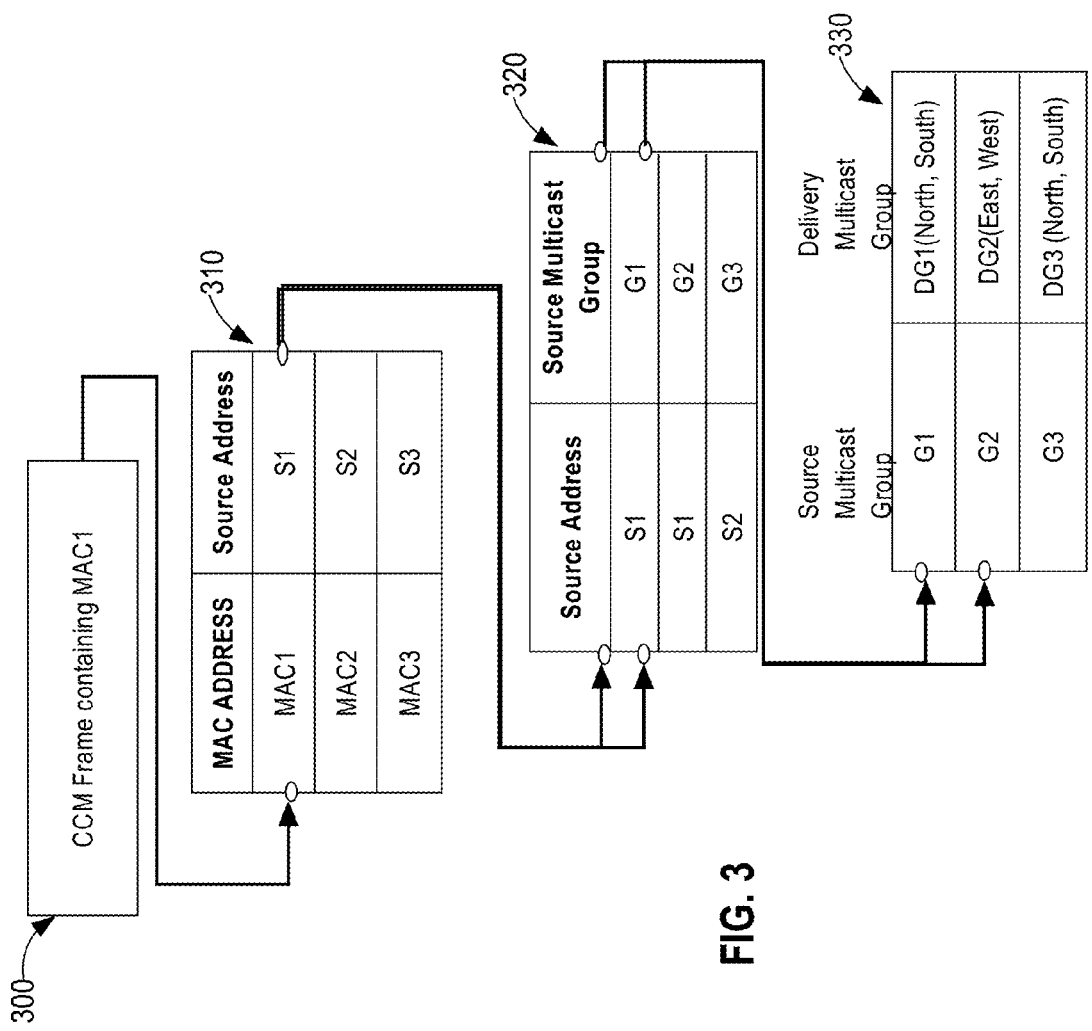
FIG. 3 illustrates mapping tables maintained by an OTV edge device and how the tables are used to determine the targets of a CCM multicast packet.

FIG. 3 illustrates mapping tables that may be maintained by an OTV edge device and how the tables are used to determine the targets of a CCM multicast packet. In particular, FIG. 3 shows an example of how the OTV edge device can track to which paths to send a CCM multicast packet. In particular, arrows in FIG. 3 illustrate mapping steps and data transformations that the OTV edge device may perform to achieve the benefits described herein.

In an embodiment, a mapping process begins when an OTV edge device receives a CCM Frame 300 containing a MAC address denoted, for the purposes of clear example, as MAC1. Table 310 is created as IP packets pass through the OTV edge device. The OTV edge device may look inside the packet and create an association between the source MAC address and source IP address. For example, the MAC address value MAC1 in frame 300 is mapped, in table 310, to source address S1.

The OTV edge device is a member of every local source multicast group for which there are recipients outside of the LAN, and therefore the OTV edge device may maintain associations between every source node IP address and every local source multicast group that the source node may use for sending IP multicast packets. Thus, the source IP address associated with the CFM frame can be used to identify all source multicast groups associated with the source node. In table 320, source address S1, for example, is associated with source multicast groups G1 and G2.

The OTV edge device also maintains data mapping local source multicast groups and the delivery groups. A delivery group is a multicast group that is known to the core network for delivering multicast messages to a set of OTV edge devices. The group of edge devices correspond to the LANs that contain destination nodes for the source multicast group.

When an OTV edge device receives an IP multicast packet for a particular source multicast group, it forwards the packet to an associated delivery group. In the example in table 330, the mapped data in the table specifies that packets sent to source multicast group G1 are forwarded to delivery multicast group DG1 and packets sent to source multicast group G2 are forwarded to delivery multicast group DG2. Packets sent to G1 are delivered to sites North 110 and South 130 and packets sent to G2 are sent to sites East 120 and West 140.

In an embodiment, the tables that are maintained as described above are used to determine where to send a CCM multicast frame so that a test message is sent on all possible paths between source and destination. The source-side OTV edge device sends internally generated CCM frames and sends them on all these possible paths. Note that all OTV edge devices are source-side when a multicast source is located in their site and receiver-side when there is a receiver for the multicast group located in their site, but the source for that multicast group is located in a different site. An edge device may be a source-side edge device for some multicast groups, receiver-side for other multicast groups, and may be neither for still other multicast groups.

OTV Receiver-Side Edge Device Response to CCM Failures

A receiver-side edge device would expect to see CCM frames from all delivery groups which it has joined. Failure to receive these frames would be an indication of failure of that delivery group. Failure of a delivery group indicates failure of connectivity for all source multicast groups that map to that delivery group. Failure of a source multicast group indicates partial failure of the entire VLAN on which that source multicast group is sent. There are several possible actions that may be supported when this failure is indicated.

In one embodiment, upon a failure to receive server-side CCM packets, a receiver-side edge device may raise an alarm indicating failure of the delivery group or of each affected VLAN.

In another embodiment, upon a failure to receive server-side CCM packets, a receiver-side edge device may place that VLAN in an error state. When in this error state, the receiver-side edge device may intercept any CCM packets sent from the server-side edge-device for that VLAN and drop them to signal the failure to any receivers in the local site.

In another embodiment, upon a failure to receive server-side CCM packets, the receiver side may signal the server-side edge device of the failure. In response, the server-side edge device may perform one of several actions.

OTV Server-side Edge Device Response to an Indication of Receiver-side CCM Failure When a source node within a LAN sends out a CCM multicast frame 300, the frames contain the MAC address of the source node. The MAC address/source IP address mapping 310 can be used to look up the MAC address from the CCM frame to find the corresponding IP address of the source node sending the CCM frame.

In the example, MAC1 is the MAC address of the CCM frame, and it is associated with Source IP address, S1. S1 can be used to index table 320 to find the set of source multicast groups associated with the source node, because these multicast groups represent all possible multicast recipients from S1.

The source multicast groups can be mapped to delivery multicast groups using table 330. If the server-side edge device has received a receiver-side edge device failure indication for that delivery group, the CCM packet may be dropped. This will provide a failure indication of delivery to the entire VLAN.

In another embodiment, upon receipt of a receiver-side failure indication, the source-side edge device can automatically determine that the receiver edge device cannot be reached through that multicast group and may configure forwarding of packets for that delivery group to both the delivery group (so as to reach the other receivers for the delivery group) and through a unicast-encapsulated copy with a destination of the receiver-side edge device.

Optimizations

Figure 4:
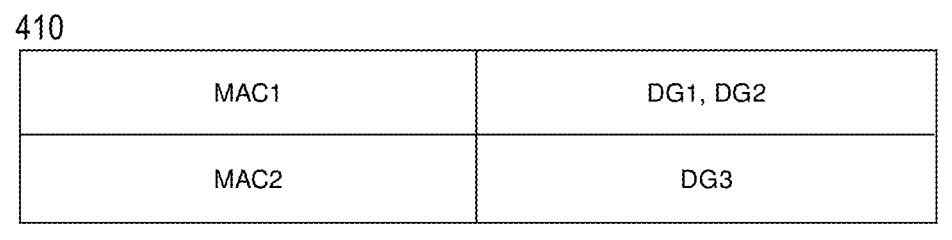

FIG. 4 shows associations that may be pre-computed based on the tables shown in FIG. 3. In particular, FIG. 4 illustrates an example of pre-computing the mapping between a MAC address and a delivery multicast group. Rather than performing several steps to map a MAC address into the set of delivery groups with which the MAC address is associated every time a CCM multicast frame is received, the results may be stored and used until one of the mapping tables shown in FIG. 3 changes. Table 410 illustrates a table that associates a set of delivery groups for each source MAC address in the LAN. For example, a first address MAC1 is mapped to delivery groups DG1, DG2 and a second address MAC2 maps to delivery group DG3.

Implementing CFM with OTV Extensions

Figure 5:
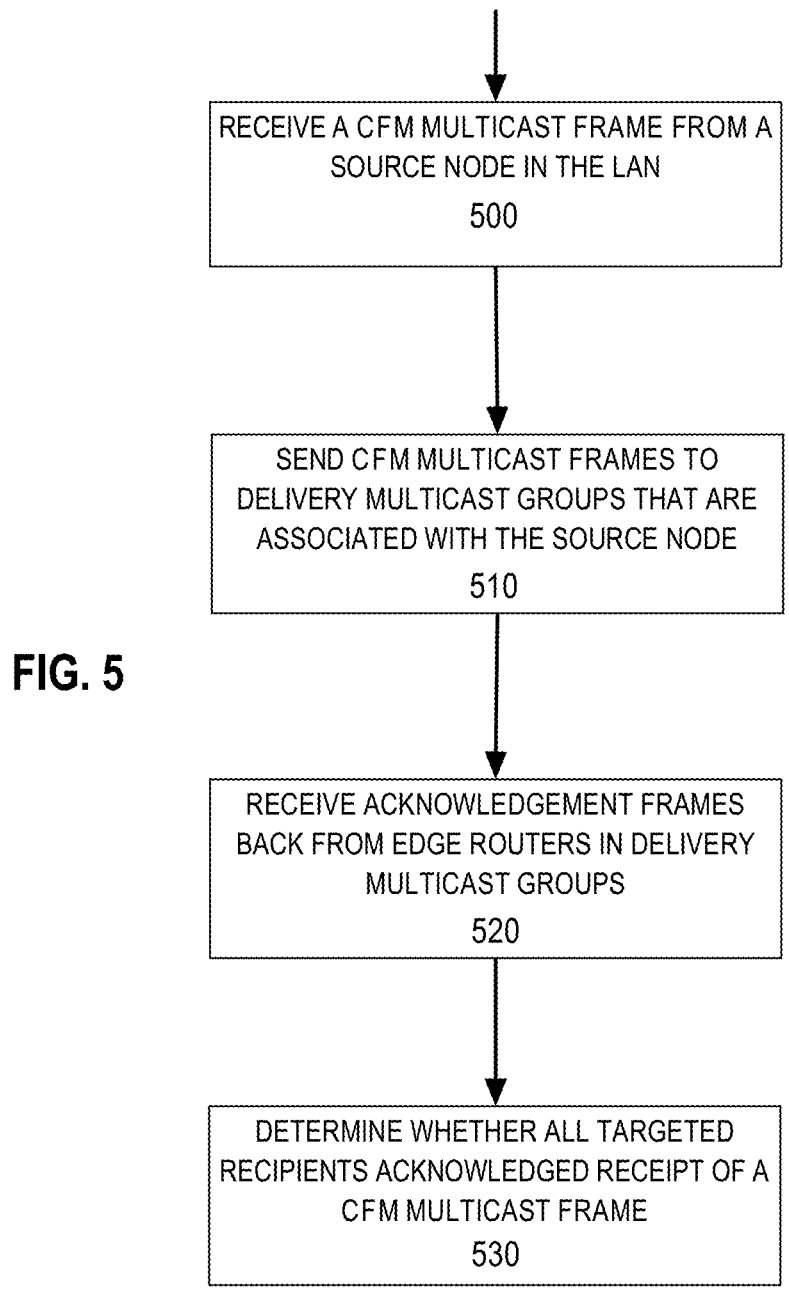
FIG. 5 illustrates an example CFM CCM process.

FIG. 5 illustrates an example CFM CCM process. In particular, FIG. 5 illustrates the role of an OTV edge device with extensions for implementing CFM for an embodiment.

In Step 500, an OTV edge device receives a CCM multicast frame from a source node in the LAN. The MAC address in the multicast frame is used to find the delivery groups in the tables maintained by the OTV edge device, as previously described.

In Step 510, the CCM multicast frame is sent to all of the delivery groups associated with the source of the CCM multicast frame.

In Step 520, the OTV edge device collects responses to from recipients of the CCM multicast frame.

In Step 530, the OTV edge device determines whether all recipients have responded or if any acknowledgement replies are missing.

In an alternate embodiment, the OTV edge device need not wait until a CCM multicast frame is received from a source node. The OTV edge device may generate a CCM multicast frame and send it to all delivery groups to which it may forward frames. Thus, all paths that are available to all source nodes in its LAN may be tested. The frequency of the OTV edge device generating CCM multicast packets may be based on when and how often CCM multicast frames are received from one or more source nodes in the LAN. For example, when source nodes are not generating many testing frames, the OTV edge device may lower the frequency of generating test frames as well.

Because all relevant delivery groups are tested in the forward direction from every OTV edge device, all the return paths are necessarily tested as well, albeit asynchronously from testing the forward path. For example, if DG1 is the delivery group managed by OTV edge device 1 for Multicast Group 1 and DG2 is the delivery group managed by OTV edge device 2 for Multicast Group 1, where OTV edge devices 1 and 2 are both members of Multicast Group 1, when OTV edge device 1 tests DG1 in the forward direction, its return path from OTV edge device 2 may not be tested until OTV edge device 2 tests DG2 in its forward direction.

Each time a CCM packet tests connectivity, the OTV edge devices may also test each of the IP unicast addresses to each of the other OTV edge devices. Thus, both unicast and multicast traffic is tested in both directions.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
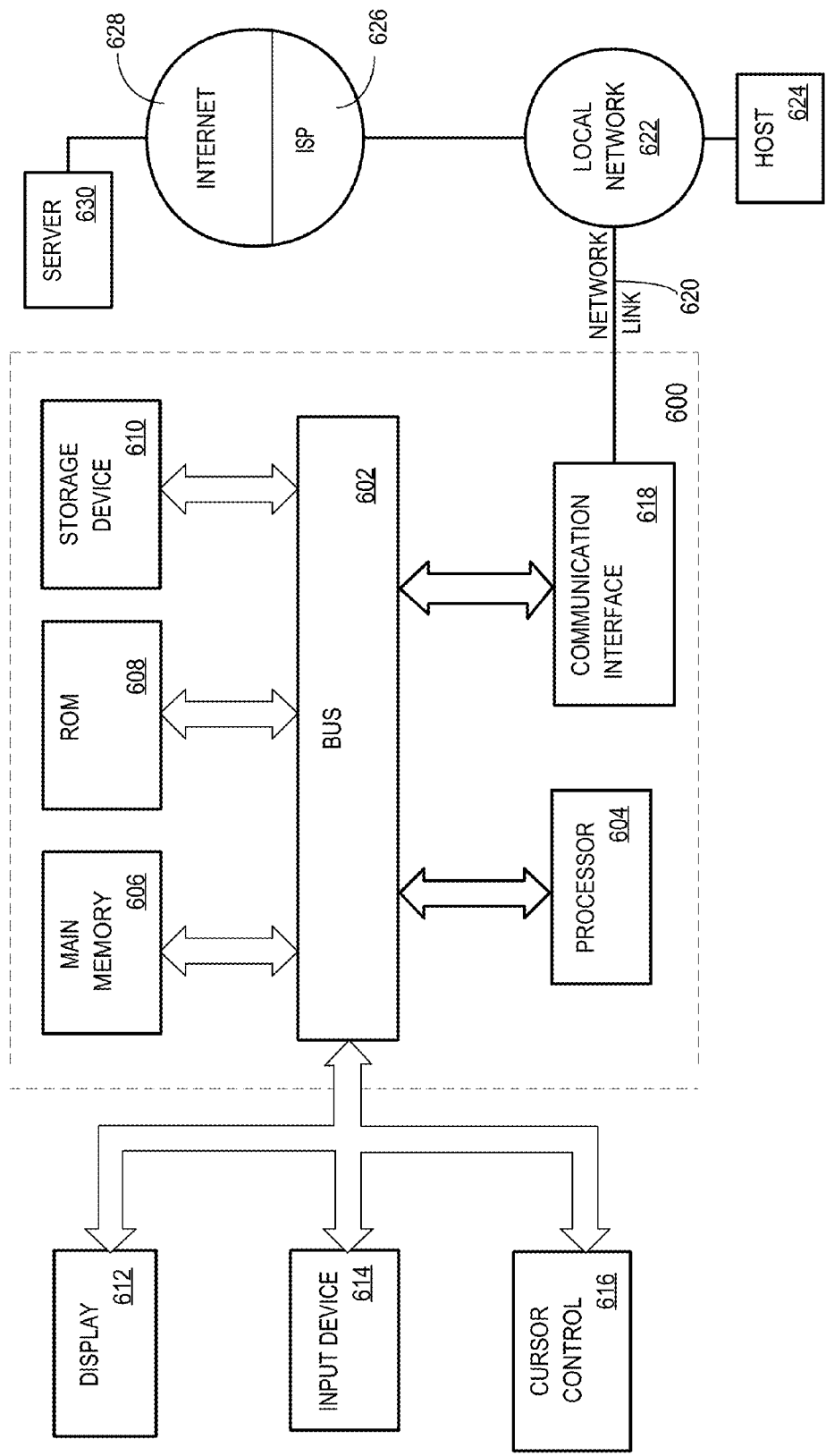
FIG. 6 illustrates a computer system upon which an embodiment may be implemented.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   in a first edge router that is in a first local area network (LAN) and that is coupled to a core network:
   maintaining, for a plurality of nodes of the first LAN, a mapping of a source address to one or more delivery multicast groups, each delivery multicast group comprising a set of other edge routers coupled with the core network, wherein each of the other edge routers is in an additional LAN separate from the first LAN, and
   wherein each of the other edge routers provide connectivity over the core network to the first LAN and one or more of the additional LANs;
   obtaining a frame associated with a particular source node of a particular source address within the first LAN;
   sending the frame to a plurality of the delivery multicast groups that are mapped, in the mapping, to the particular source address;
   determining if any acknowledgement replies are missing from one or more of the other edge routers in the plurality of the delivery multicast groups receiving the frame;
   wherein the frame is a continuity check message (CCM) frame.

2. The method of claim 1, further comprising:
   for each source node in the LAN, maintaining an association between a unique source node identifier and a network address;
   for each local source multicast group to which the particular source node sends traffic, creating an association between the particular source address and said each local source multicast group;
   for said each local source multicast group, maintaining an association with a delivery multicast group of the delivery multicast groups.

3. The method of claim 2, further comprising determining and storing an association between each unique source node identifier and a set of delivery multicast groups to which traffic is sent from a source node identified by said each unique source identifier.

4. The method of claim 2, wherein the unique source node identifier is a media access control (MAC) address.

5. The method of claim 2, wherein the network address is an internet protocol (IP) address.

6. A method of claim 1, further comprising the first edge router periodically sending a frame to each delivery multicast group that is stored in association with any source node in the LAN.

7. A method comprising:
in a first edge router that is in a local area network (LAN) and that is coupled to a core network: retrieving a set of delivery multicast groups comprising each delivery multicast group stored in association with a source node in the LAN, each delivery multicast group of the set of delivery multicast groups having members comprising a set of edge routers;
for each delivery multicast group of the set of delivery multicast groups, generating a continuity check message (CCM) frame and sending the continuity check message (CCM) frame to said each delivery multicast group;
receiving from said each edge router of the set of edge routers a unicast acknowledgement of receipt of the first continuity check message (CCM) multicast frame;
determining whether the acknowledgement of receipt has been received from a union of all members of the set delivery multicast groups.

8. The method of claim 7, further comprising raising an alert in response to determining that the acknowledgement of receipt has not been received from a union of all members of the set of delivery multicast groups.

9. A non-transitory computer-readable storage medium storing instructions, which when executed, cause one or more processors to perform:
in a first edge router that is in a first local area network (LAN) and that is coupled to a core network:
maintaining, for a plurality of nodes of the first LAN, a mapping of a source address to one or more delivery multicast groups, each delivery multicast group comprising a set of other edge routers coupled with the core network, wherein each of the other edge routers is in an additional LAN separate from the first LAN, and
wherein each of the other edge routers provide connectivity over the core network to the first LAN and one or more of the additional LANs;
obtaining a frame from-associated with a particular source node of a particular source address within the first LAN;
sending the frame to a plurality of the delivery multicast groups that are mapped, in the mapping, to the particular source address;
determining if any acknowledgement replies are missing from one or more of the other edge routers in the plurality of the delivery multicast groups receiving the frame; wherein
the frame is a continuity check message (CCM) frame.

10. The non-transitory computer-readable storage medium of claim 9, further comprising instructions, which when executed, cause the one or more processors to perform:
for each source node in the LAN, maintaining an association between a unique source node identifier and a network address;
for each local source multicast group to which the particular source node sends traffic, creating an association between the particular source address and said each local source multicast group;
for said each local source multicast group, maintaining an association with a delivery multicast group of the delivery multicast groups.

11. The non-transitory computer-readable storage medium of claim 10, further comprising instructions, which when executed, cause the one or more processors to perform:
determining and storing an association between each unique source node identifier and a set of delivery multicast groups to which traffic is sent from a source node identified by said each unique source identifier.

12. The non-transitory computer-readable storage medium of claim 10, wherein the unique source node identifier is a media access control (MAC) address.

13. The non-transitory computer-readable storage medium of claim 10, wherein the network address is an internet protocol (IP) address.

14. The non-transitory computer-readable storage medium of claim 9, further comprising instructions, which when executed, cause the one or more processors to perform:
the first edge router periodically sending a frame to each delivery multicast group that is stored in association with any node in the LAN.

15. A non-transitory computer-readable storage medium storing instructions, which when executed, cause one or more processors to perform:
in a first edge router that is in a local area network (LAN) and that is coupled to a core network: retrieving a set of delivery multicast groups comprising each delivery multicast group stored in association with a source node in the LAN, each delivery multicast group of the set of delivery multicast groups having members comprising a set of edge routers;
for each delivery multicast group of the set of delivery multicast groups, generating a continuity check message (CCM) frame and sending the continuity check message (CCM) frame to said each delivery multicast group;
receiving from said each edge router of the set of edge routers a unicast acknowledgement of receipt of the first continuity check message (CCM) multicast frame;
determining whether the acknowledgement of receipt has been received from a union of all members of the set delivery multicast groups.

16. The non-transitory computer-readable storage medium of claim 15, further comprising instructions, which when executed, cause the one or more processors to perform:
raising an alert in response to determining that the acknowledgement of receipt has not been received from a union of all members of the set of delivery multicast groups.

* * * * *